United States Patent
Moody et al.

(10) Patent No.: US 10,185,780 B1
(45) Date of Patent: Jan. 22, 2019

(54) RESHARING CONTENT ITEMS

(71) Applicant: Google Inc., Mountian View, CA (US)

(72) Inventors: Paul Moody, Mountain View, CA (US);
Mayuresh Saoji, Fremont, CA (US);
Vikas Sukla, Sunnyvale, CA (US);
Andrey Prigogin, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 325 days.

(21) Appl. No.: 14/054,719

(22) Filed: Oct. 15, 2013

(51) Int. Cl.
*G06F 17/30* (2006.01)

(52) U.S. Cl.
CPC .................. *G06F 17/3089* (2013.01)

(58) Field of Classification Search
CPC .................................................. G06F 17/3089
USPC .......................... 707/731, 758, 769; 709/204
See application file for complete search history.

(56) References Cited

U.S. PATENT DOCUMENTS

| | | | | |
|---|---|---|---|---|
| 8,090,717 | B1* | 1/2012 | Bharat et al. | 707/731 |
| 2006/0173985 | A1* | 8/2006 | Moore | G06F 17/3089 709/223 |
| 2010/0185664 | A1* | 7/2010 | Baggott | G06F 17/3089 707/769 |
| 2013/0332523 | A1* | 12/2013 | Luu | 709/204 |

* cited by examiner

*Primary Examiner* — Syling Yen
(74) *Attorney, Agent, or Firm* — Patent Law Works LLP

(57) ABSTRACT

The disclosure includes a system and method configured for resharing content items. The system includes a processor and memory storing instructions that, when executed, cause the system to: receive one or more social-content items that contain one or more first links; determine whether the one or more social-content items are related to a news-story cluster (including one or more news-story items) based on the one or more first links, the news-story cluster including one or more second links; responsive to determining that the one or more social-content items are related to the news-story cluster, associate the one or more social-content items with the news-story cluster; rank the one or more social-content items; and generate a resharing content item including the one or more ranked social-content items.

20 Claims, 9 Drawing Sheets

RESHARING CONTENT ITEMS

BACKGROUND

The specification relates to resharing content items based on selection and ranking.

Over the last decade, social networking has become increasingly popular. Users may view news via a social feed posted on a social network. Yet, as users move from traditional news websites to social media websites, it has become difficult for users to find news-story posts that have complete reports on a particular news-story. On one hand, users can follow individual news publishers in the social media system, but as they follow multiple publishers they often see multiple, repetitive posts on the same news story. On the other hand, in many instances, users miss posts from other news organizations that they do not follow. To receive comprehensive news reports on all occurrences that are news worthy, users must visit individual streams for multiple news publishers. Yet, even by visiting these individual publisher streams, they are not assured that they will receive highly ranked posts that are not duplicative, yet cover all the news worthy occurrences across a variety of topics from a variety of sources.

SUMMARY

According to one innovative aspect of the subject matter described in this disclosure, a system for resharing content items includes: a processor and memory storing instructions that, when executed, cause the system to: receive one or more social-content items that contain one or more first links; determine whether the one or more social-content items are related to a news-story cluster based on the one or more first links, the news-story cluster including one or more second links; responsive to determining that the one or more social-content items are related to the news-story cluster, associate the one or more social-content items with the news-story cluster; rank the one or more social-content items; and generate a resharing content item including the one or more ranked social-content items. In some instances, the news-story cluster may include multiple news-story items.

In general, another innovative aspect of the subject matter described in this disclosure may be embodied in methods that include: receiving one or more social-content items that contain one or more first links; determining whether the one or more social-content items are related to a news-story cluster based on the one or more first links, the news-story cluster including one or more second links; responsive to determining that the one or more social-content items are related to the news-story cluster, associating the one or more social-content items with the news-story cluster; ranking the one or more social-content items; and generating a resharing content item including the one or more ranked social-content items. In some instances, the news-story cluster may include multiple news-story items.

Other aspects include corresponding methods, systems, apparatus, and computer program products for these and other innovative aspects.

These and other implementations may each optionally include one or more of the following operations and features. For instance, the operations further include: comparing the one or more first links with the one or more second links and determining whether the one or more first links match the one or more second links; removing one or more duplicated social-content items from the resharing content item.

For instance, the features include: the one or more social-content items associated with one or more news publishers. For instance, ranking the one or more social-content items is based on quality of the one or more news publishers. For instance, ranking the one or more social-content items is based on quality of the one or more news publishers. For instance, the resharing content item also includes one or more news-content items contained in the news-story cluster. For instance, where the news-story cluster includes multiple news-story items.

The present disclosure may be particularly advantageous in a number of respects. First, the system may aggregate individual articles from multiple publisher sites that are related to the same story. Second, the system may gather, organize, and rank news-story related posts. Third, the system may present these articles ranked by both popularity on external websites and publisher quality.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
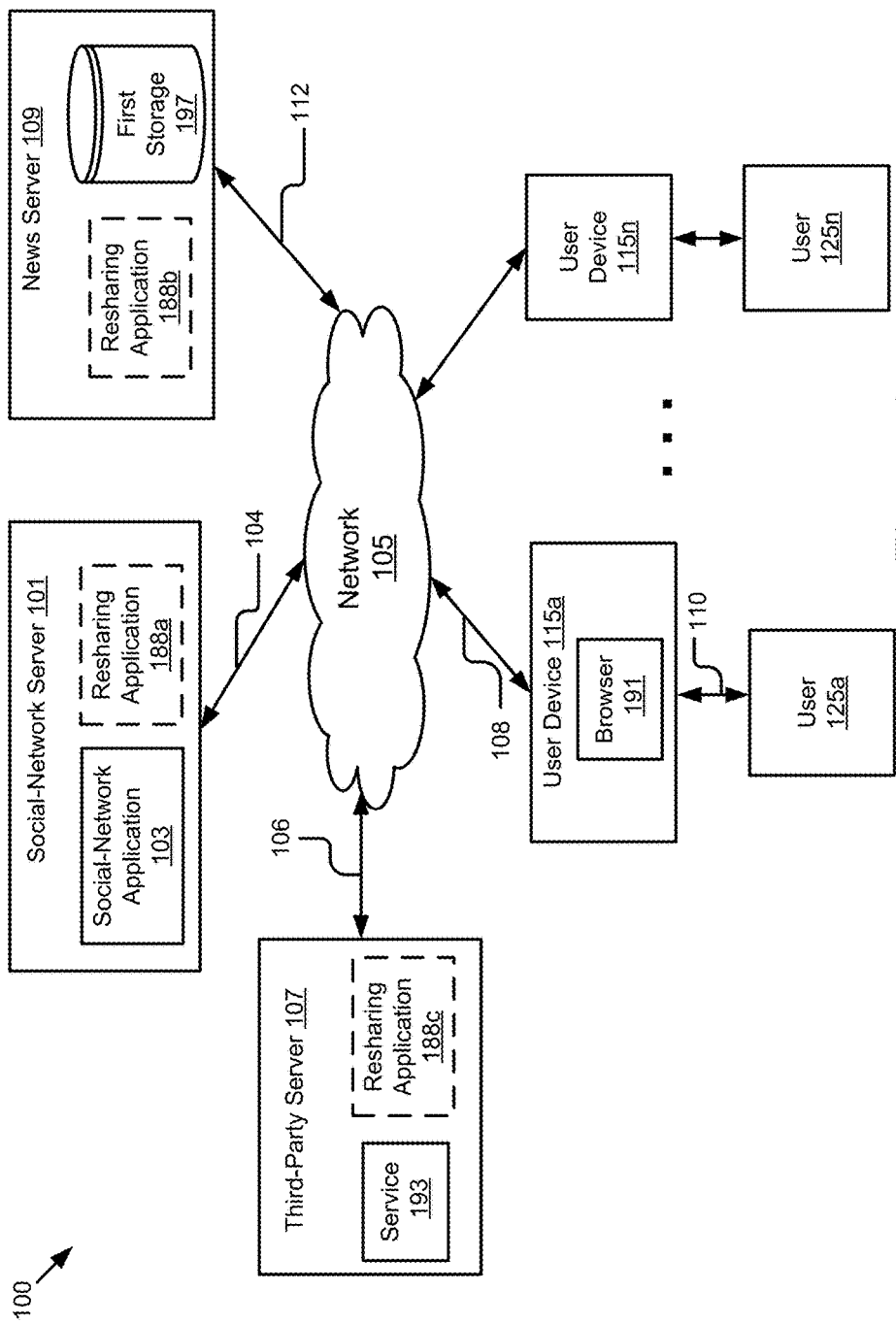
FIG. 1 is a block diagram illustrating an example system for resharing content items based on selection and ranking.

FIG. 1 illustrates a block diagram of some implementations of a system 100 for resharing content items (e.g., news-story clusters, which may include multiple news-story items) based on selection and ranking. The illustrated system 100 includes user devices 115*a* . . . 115*n* (also referred to herein individually and collectively by reference numeral 115) that can be accessed by users 125*a* . . . 125*n* (also referred to herein individually and collectively by reference numeral 125), a social-network server 101, a third-party server 107 and a news server 109. In the illustrated implementation, these entities of the system 100 are communicatively coupled via a network 105.

The user devices 115*a* through 115*n* in FIG. 1 can be used by way of example. Although FIG. 1 illustrates two user devices 115*a* and 115*n*, the present disclosure applies to a system architecture having one or more user devices 115.

Furthermore, although FIG. 1 illustrates one network 105 coupled to the user devices 115, the social network server 101, the third-party server 107 and the news server 109, in practice one or more networks 105 can be connected to these entities. Furthermore, while FIG. 1 includes one social network server 101, one third-party server 107 and one news server 109, the architecture 100 could include one or more social network servers 101, one or more third-party servers 107 and one or more news servers 109.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

The social network server 101 can be a hardware server that includes a processor, a memory and network communication capabilities. In the illustrated implementation, the social network server 101 is coupled to the network 105 via signal line 104. The social network server 101 sends and receives data to and from one or more of the user devices 115a, 115n, the third-party server 107 and the news server 109 via the network 105. The social network server 101 includes a social network application 103. A social network can be a type of social structure where the users 125 may be connected by a common feature. The common feature includes relationships or connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, it should be understood that the social network server 101 and the social network application 103 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating and others may be of general interest or a specific focus. In some implementations, the social network includes a service that provides a social feed describing one or more social activities of a user 125. For example, the social feed includes one or more status updates for the user 125 describing the user's actions, expressed thoughts, expressed opinions, etc. In some implementations, the social network application 103 can be stored and executed on one of the third-party server 107 and the news server 109. In some implementations, the service provided by the social network application 103 is referred to as a "social network service." Other implementations can be possible. In some implementations, the services and components of the third-party server 107, social network server 101, and news server 109 can be provided by the same one or more servers. Moreover, the separation of various components and servers in the implementations described herein should not be understood as requiring such separation in all implementations, and it should be understood that the described components and servers can generally be integrated together in a single component or server.

In some implementations, the social network server 101 also includes a resharing application 188a (also referred to herein individually and collectively by reference numeral 188). In some implementations, the resharing application 188 can be stored on the news server 109. For example, the resharing application 188b can be stored on the news server 109, which is connected to the network 105 via signal line 112. In some implementations, the resharing application 188 can be included in the third-party server 107. For example, the resharing application 188c can be stored in the third-party server 107. In some implementations, the resharing application 188 can be stored on a user device 115. For example, a portion or all of a resharing application (not explicitly illustrated) can be stored in the user device 115a. It should be understood that the resharing application 188 can be stored in either one of the devices and servers or in a combination of the devices and servers that are illustrated.

The resharing application 188 may be code and routines for resharing content items based on selection and ranking functionality and/or operations. For example, the resharing application 188 includes code and routines for matching social-content items to news story clusters and generating resharing content items based on matching. In some implementations, the resharing application 188 can be implemented using hardware including a field-programmable gate array ("FPGA") or an application-specific integrated circuit ("ASIC"). In some other instances, the resharing application 188 can be implemented using a combination of hardware and software. In some implementations, the resharing application 188 may be stored in a combination of the devices and servers, or in one of the devices or servers.

In some implementations, the resharing application 188 receives one or more social-content items that contain one or more first links. In some instances, the one or more social-content items are associated with one or more news publishers. For example, the one or more social-content items may be news articles published by one or more news publishers on social media websites. In some instances, the resharing application 188 receives social-content items in social media system and processes the social-content items to determine one or more social-content items that contain a link (e.g., a uniform resource locator (URL)). Examples of the social-content items can include, but not limited to, posts, comments, photos, videos, articles, etc., received by social media systems. For example, the resharing application 188 may be configured to receive one or more posts that contain links to news articles published on a third-party news website.

In some implementations, the resharing application 188 is configured to determine whether the one or more social-content items are related to a news-story cluster based on the one or more first links. In some instances, a news-story cluster includes content describing a news story of one topic. For example, a news-story cluster illustrated includes multiple news articles describing how to patent diagnostic tools for assessing the risks of cancer. In some instances, the news-story clusters include one or more second links to such news articles published on multiple third-party news websites. In some instances, the resharing application 188 determines whether the one or more social-content items are related to the news story described by the cluster. For example, the resharing application 188 is configured to determine whether the one or more social-content items describe the same news story as the cluster. In some implementations, the resharing application 188 is configured to compare the one or more first links with the one or more second links and to determine whether the one or more first links match the one or more second links. For example, the resharing application 188 compares the one or more first links contained in the one or more social-content items with the one or more second links included in the news-story cluster to determine whether the one or more first links are the same or substantially similar to the one or more second links. In some instances, the resharing application 188 determines if the one or more first links lead to the same or substantially similar news articles as the one or more second links do. If so, the resharing application 188 determines that the one or more first links match the one or more second links. In some implementations, if the resharing application 188 determines that the one or more social-content items are related to the news-story cluster, the resharing application 188 associates the one or more social-content items with the news-story cluster.

In some implementations, the resharing application 188 ranks the one or more social-content items. In some implementations, ranking the one or more social-content items is based on quality of the one or more news publishers. For example, the quality of the one or more news publishers can be determined by third-party websites, e.g., third-party news websites. In some instances, the resharing application 188 ranks the one or more social-content items based on the quality of the one or more news publishers determined by third-party news websites. In some instances, ranking the one or more social-content items is based on third-party ranking scores. For example, the resharing application 188 receives one or more third-party ranking scores for the one or more social-content items from one or more third-party servers. In some instances, the third-party ranking scores are determined based on a set of criteria-metrics. In some implementations, ranking the one or more social-content items is based on social popularities of the one or more social-content items. In some instances, the resharing application 188 determines social popularity of a social-content item based on the number of user social-activities associated with the social-content item. Examples for the user social-activities associated with a social-content item may include, but are not limited to, comments on the social-content item, positive endorsements for the social-content item, negative endorsements for the social-content item, reviews on the social-content item, shares of the social-content item, etc. In some instances, the resharing application 188 calculates a social popularity score based on the number of the user social-activities associated with the social-content item. In some instances, the resharing application 188 ranks social-content items with higher social popularities higher. In some instances, the resharing application ranks social-content items based on both third-party ranking scores and social popularities.

In some implementations, the resharing application 188 generates a resharing content item including the one or more ranked social-content items. For example, the resharing application 188 generates a resharing post including one or more ranked social posts that are associated with the news-story cluster. In some implementations, the resharing content item also includes one or more news-content items contained in the news-story cluster. For example, the resharing application 188 generates a resharing post that also includes one or more news articles from the news-story cluster. In some implementations, the resharing application 188 removes one or more duplicated social-content items from the resharing content item. In some instances, the resharing application 188 determines if there are two or more social-content items that are the same or substantially similar to each other. In some instances, the resharing application 188 determines whether there are two or more social-content items describing the same or substantially similar content. In some instances, the resharing application 188 determines whether there are two or more social-content items including two or more first links leading to the same or substantially similar content published on third-party websites. If so, the resharing application 188 determines that they are duplicated and removes all but one of the social-content items from the resharing content item. The resharing application 188 will be described in further detail below with reference to FIGS. 2-7.

The third-party server 107 can be a hardware server that includes a processor, a memory and network communication capabilities. In the illustrated implementation, the third-party server 107 is coupled to the network 105 via signal line 106. The third-party server 107 sends and receives data to and from other entities of the system 100 via the network 105. In some instances, the third-party server 107 may as an option include a resharing application 188*c*.

In some implementations, the third-party server 107 may also include a service module 193. The service module 193 can be code and routines for providing a service to a user 125. In some instances, the service module 193 cooperates with the social network application 103 included in the social network server 101 to provide social services to the user 125. For example, the service module 193 includes code and routines for providing a web page with an embedded video, an embedded link to a social game, a "share" button for sharing content included in the web page to other users 125, an "acknowledgement" button for acknowledging content included in the web page or an embedded link for installing an application to a user 125. The service module 193 also includes code and routines for allowing the user 125 to interact with the web page, the video, the social game, to share content on the web page, to acknowledge content on the web page or to install the application. Other examples of services provided by the service module 193 include, but not limited to, providing a news feed, publishing an article, generating a playlist, publishing a video, posting a picture, commenting on a post, adding a user 125 to a social connection, or other online services.

The news server 109 can be a hardware server that includes a processor, a memory and network communication capabilities. In the illustrated implementation, the news server 109 is coupled to the network 105 via signal line 112. The news server 109 sends and receives data to and from other entities of the system 100 via the network 105. In some implementations, the news server 109 includes a resharing application 188*b* and first storage 197. The components of the news server 109 are communicatively coupled to each other.

In some implementations, the news server 109 includes a news-posting module (not illustrated) for retrieving news data from a variety of resources, organizing the news data into a set of news-story clusters and publishing the set of news-story clusters. In some instances, a news-story cluster includes one or more news-content items, e.g., news articles published by publishers. In some instances, the items in one news-story cluster describe the same news story. For example, one news-story cluster includes multiple news articles describing the same topic of news, e.g., "Turkey protests." In some implementations, the news-posting module determines top news story. In some implementations, the news-posting module ranks news-content items included in one news-story cluster.

The first storage device 197 can be a non-transitory memory that stores data for providing the functionality described herein. The first storage 197 may be a dynamic random access memory (DRAM) device, a static random access memory (SRAM) device, flash memory or some other memory devices. In some implementations, the first storage 197 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In some implementations, the first storage 197 stores news-story clusters including news-content items.

The user device 115a, 115n may be a computing device that includes a memory and a processor, for example a laptop computer, a desktop computer, a tablet computer, a mobile telephone, a personal digital assistant ("PDA"), a mobile email device, a portable game player, a portable music player, a television with one or more processors embedded therein or coupled thereto or other electronic device capable of accessing a network 105. In some implementations, the user device 115 includes a browser 191 for accessing online services. In the illustrated implementation, the user device 115a is communicatively coupled to the network 105 via signal line 108. The user 125a interacts with the user device 115a via signal line 110. The user device 115n is communicatively coupled to the network 105. The user 125n also interacts with the user device 115n. In some implementations, the resharing application 188 acts in part as a thin-client application that may be stored on the user device 115a, 115n and in part as components that may be stored on one or more of the social network server 101, the third-party server 107 and the news server 109.

Figure 2:
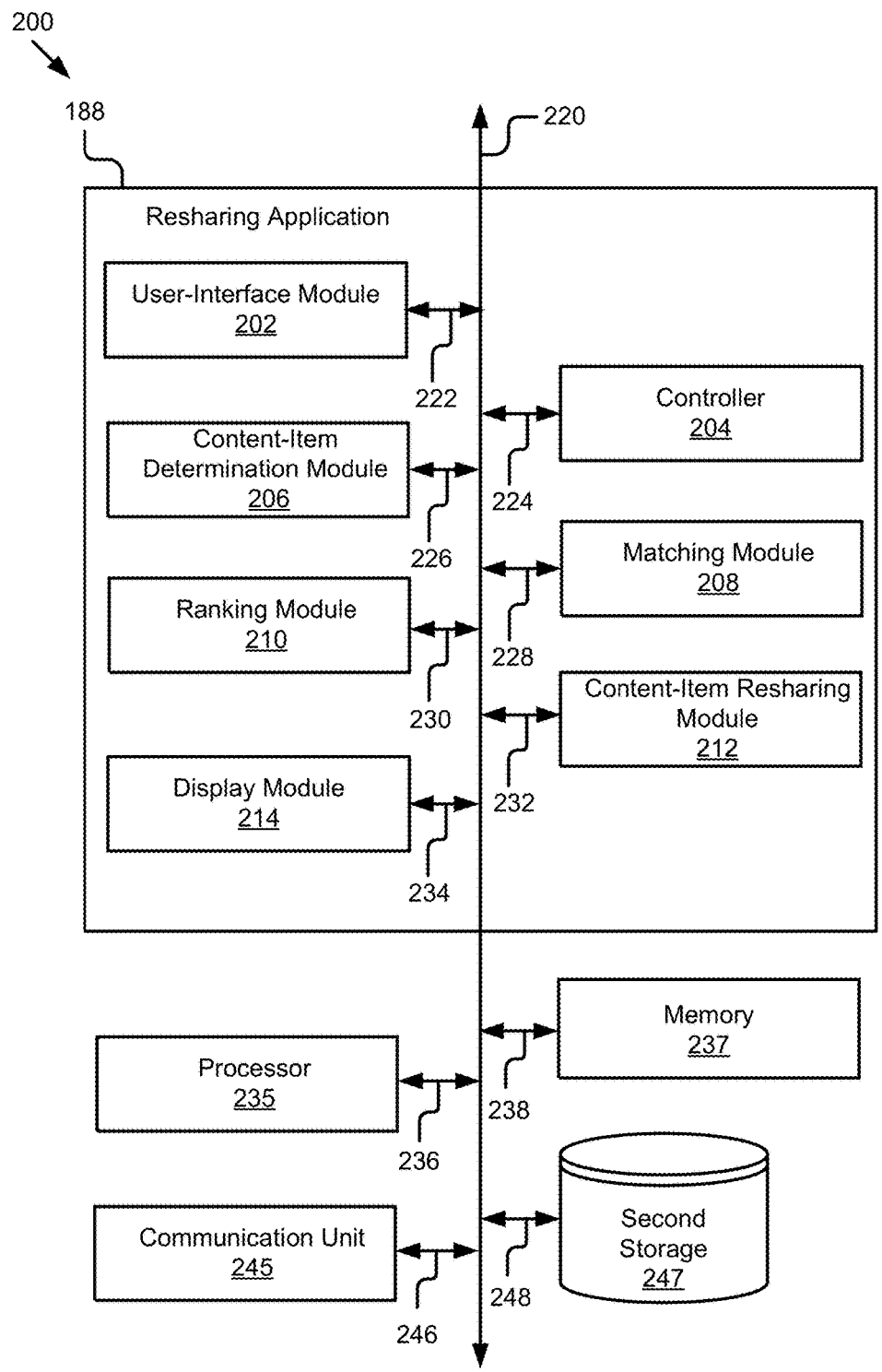
FIG. 2 is a block diagram illustrating an example resharing application.

Referring now to FIG. 2, an example of the rank module 195 is shown in more detail. FIG. 2 is a block diagram of a computing device 200 that includes a resharing application 188, a processor 235, a memory 237 and a communication unit 245 according to some examples. The components of the computing device 200 are communicatively coupled by a bus 220. In some implementations, the computing device 200 can be one of a social network server 101, a user device 115, a third-party server 107 and a news server 109.

The processor 235 includes an arithmetic logic unit, a microprocessor, a general purpose controller or some other processor array to perform computations and provide electronic display signals to a display device. The processor 235 is coupled to the bus 220 for communication with the other components via signal line 236. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays and physical configurations may be possible.

The memory 237 stores instructions or data that may be executed by the processor 235. The memory 237 is coupled to the bus 220 for communication with the other components via signal line 238. The instructions or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 245 transmits and receives data to and from at least one of the user device 115, the third-party server 107, the news server 109 and the social network server 101 depending upon where the resharing application 188 may be stored. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5 or similar port for wired communication with the user device 115. In some implementations, the communication unit 245 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS and SMTP, etc.

The second storage device 247 can be a non-transitory memory that stores data for providing the functionality described herein. The second storage 247 may be a dynamic random access memory (DRAM) device, a static random access memory (SRAM) device, flash memory or some other memory devices. In some implementations, the second storage 247 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In some implementations, the second storage 247 stores data helpful for components of the resharing application 188 to successfully perform its functionalities. For example, the second storage 247 stores resharing data describing resharing content items generated by the resharing application 188.

In the illustrated implementation shown in FIG. 2, the resharing application 188 includes a user-interface module 202, a controller 204, a content-item determination module 206, a matching module 208, a ranking module 210, a content-item resharing module 212 and a display module 214. These components of the resharing application 188 are communicatively coupled to each other via the bus 220.

The user-interface module 202 can be software including routines for generating graphical data for providing user interfaces. In some implementations, the user-interface module 202 can be a set of instructions executable by the processor 235 to provide the functionality described below for generating graphical data for providing user interfaces described below with reference to FIGS. 7 and 8. In some instances, the user-interface module 202 can be stored in the memory 237 of the computing device 200 and can be accessible and executable by the processor 235. The user-interface module 202 may be adapted for cooperation and communication with the processor 235 and other components of the computing device 200 via signal line 222.

In some implementations, the user-interface module 202 receives display data describing a resharing content item from the display module 214 and generates graphical data for providing a user interface that displays the resharing content item to users 125. For example, the resharing content item may be displayed next to an acknowledgement button, a comment button or a share button in the user interface. The user-interface module 202 sends the graphical data to a user device 115 operated by a user 125, causing the user device 115 to present the resharing content item to the user 125 via the user interface. In some implementations, the user-interface module 202 receives data describing user interactions with the user interfaces. For example, when a user 125 acknowledges a content item (e.g., a news article), the user-interface module 202 receives user interaction data describing the acknowledgement. In some instances, the user-interface module 202 sends the user interaction data to the controller 204 for delivering to one or more appropriate modules for further processing or to the storage 247 for strong the user interaction data. For example, the user interaction data can be sent to the ranking module 210 for ranking social-content items.

In some implementations, the user-interface module 202 receives social-content items published by users 125 including publishers. For example, when a publisher, through a user interface, publishes a social post on a social network website, the user-interface module 202 receives the social post and sends the social post to the controller 204 for delivering to one or more appropriate modules for further processing or to the storage 247 for storing the social post.

The controller 204 can be software including routines for handling communications between the resharing application 188 and other components of the computing device 200. In some implementations, the controller 204 can be a set of instructions executable by the processor 235 to provide the functionality described below for handling communications between the resharing application 188 and other components of the computing device 200. In some instances, the controller 204 can be stored in the memory 237 of the computing device 200 and can be accessible and executable by the processor 235. The controller 204 may be adapted for cooperation and communication with the processor 235 and other components of the computing device 200 via signal line 224.

The controller 204 sends and receives data, via the communication unit 245, to and from one or more of a user device 115, a social network server 101, a third-party server 107 and a news server 109. In some instances, the controller 204 cooperates with the content-item determination module 206 to receive, via the communication unit 245, social-content items published by users 125 on one or more websites from other entities of the system 100. In some instances, the controller 204 receives graphical data for providing a user interface that displays a resharing content item from the user-interface module 202 and sends, via the communication unit 245, the graphical data to a user device 115, causing the user device 115 to present the user interface displaying the resharing content item to a user 125.

In some implementations, the controller 204 receives data from components of the resharing application 188 and stores the data in the second storage 247. For example, the controller 204 receives resharing data describing a resharing content item from the content-item resharing module 212 and stores the resharing data in the second storage 247. In some implementations, the controller 204 receives data from the first storage 197 and sends the data to one or more appropriate components of the resharing application 188. For example, the controller 204 receives news-cluster data describing one or more news-story clusters from the first storage 197 and sends the news-cluster data to the matching module 208 for matching the social-content items to news-story clusters.

In some implementations, the controller 204 receives data from one or more appropriate components of the resharing application 188 or the first storage 197 or the second storage 247 and sends the data to other components of the system 100. For example, the controller 204 receives data describing ranking scores for social-content items from the ranking module 210 and sends the data describing the rankings for social-content items to the social network server 101 or the third-party server 107 for generating recommendations for users 125 regarding web pages to follow, news article to review, publisher to subscribe, etc., based on the rankings for social-content items. For example, the controller 204 can also send the data describing rankings for social-content items to the social network server 101 or the third-party server 107 for implement social content stream personalization for users 125.

The content-item determination module 206 can be software including routines for determining social-content items that contain links. In some implementations, the content-item determination module 206 can be a set of instructions executable by the processor 235 to provide the functionality described below for determining social-content items that contain links. In some instances, the content-item determination module 206 can be stored in the memory 237 of the computing device 200 and can be accessible and executable by the processor 235. The content-item determination module 206 may be adapted for cooperation and communication with the processor 235 and other components of the computing device 200 via signal line 226.

In some implementations, the content-item determination module 206 cooperates with the controller 204 to receive social-content items published by users 125 from a variety of resources. For example, the content-item determination module 206 receives social-content items from social network websites provided by the social network server 101. In some instances, the content-item determination module 206 receives social-content items from any other appropriate systems where users 125 can publish social-content items. For example, the content-item determination module 206 receives social-content items from a third-party website provided by the third-party server 107 where users 125 can publish social-content items. Examples for social-content items can include, but not limited to, posts, comments, photos, videos, audios, articles, etc. In some instances, one or more of the social-content items include links to content published on this or other systems. For example, a social post published by a user 125 on a social network website contains a link (e.g., a URL) to a news article published on a news website. In some instances, the social post can be published by a publisher and the link contained in it can be published by the same publisher or a different publisher.

In some implementations, the content-item determination module 206 determines if a particular social-content item contains a link. For example, the content-item determination module 206 parses the particular social-content item to determine if a URL is present in the social-content item. For example, the content-item determination module 206 parses a social post and determine if a URL linking to other published content is present in the title or the body of the social post. For example, the content-item determination module 206 processes a photo to determine if a URL is embedded or attached on the photo. In some instances, the content-item determination module 206 determines, from the received social-content items, one or more social-content items containing one or more links. In some implementations, the content-item determination module 206 stores the determined social-content items containing links in the second storage 247. In some implementations, the content-item determination module 206 sends the determined social-content items containing links to the matching module 208 for matching the social-content items to news-story clusters.

The matching module 208 can be software including routines for matching social-content items to news-story clusters. In some implementations, the matching module 208 can be a set of instructions executable by the processor 235 to provide the functionality described below for matching social-content items to news-story clusters. In some instances, the matching module 208 can be stored in the memory 237 of the computing device 200 and can be accessible and executable by the processor 235. The matching module 208 may be adapted for cooperation and communication with the processor 235 and other components of the computing device 200 via signal line 228.

In some implementations, the matching module 208 receives one or more social-content items. In some instances, the matching module 208 receives one or more social-content items containing one or more first links from the content-item determination module 206. In some instances, the matching module 208 receives one or more social-content items containing one or more first links from the second storage 247. In some implementations, the matching module 208 receives one or more news-story clusters. In some instances, a news-story cluster is generated by the news-posting module in the news server 109 and stored in the first storage 197 as described above with reference to FIG. 1. In some instances, a news-story cluster includes content describing a news story of one topic. For example, a news-story cluster includes multiple news articles describing how to patent diagnostic tools for assessing the risks of cancer. In some instances, a news-story cluster contains one or more second links to content describing a news story. For example, a news-story cluster includes one or more second links to such news articles describing how to patent diagnostic tools for assessing the risks of cancer. In some instances, these news articles can be published on a news website operated by the news server 109. In some instances, these news articles can be published on one or more third-party websites.

In some implementations, the matching module 208 matches the one or more social-content items to the one or more news-story clusters. In some instances, the matching module 208 determines whether the one or more social-content items are related to a news-story cluster. For example, the matching module 208 determines whether the one or more social-content items are related to the news story described by the news-story cluster. For example, the matching module 208 determines whether the one or more social-content items describe the same news story as the cluster does. In some implementations, the matching module 208 matches one or more social-content items containing one or more first links to the one or more news-story clusters based on the one or more first link. In some instances, the matching module 208 determines whether a social-content item containing a first link is related to a news-story cluster containing a second link by comparing the first link with the second link. For example, the matching module 208 compares the first link with the second link to determine if the first link is the same or substantially similar to the second link. In some instances, the matching module 208 determines whether the first link leads to the same or substantially similar news articles as the second link does. If so, the matching module 208 determines that the first link matches the second link and thus the social-content item is related to the news-story cluster.

In some implementations, if the matching module 208 determines that a social-content item is related to a news-story cluster, the matching module 208 associates the social-content item to the news-story cluster. In some implementations, the matching module 208 determines that multiple social-content items are related to one news-story cluster. The matching module 208 associates the multiple social-content items to the news-story cluster. In such a scenario, in some instances the matching module 208 sends the multiple social-content items related to the same news-story cluster to the ranking module 210 for ranking the multiple social-content items. In some implementations, the matching module 208 stores the one or more associated social-content items in the second storage 247.

The ranking module 210 can be software including routines for ranking social-content items. In some implementations, the ranking module 210 can be a set of instructions executable by the processor 235 to provide the functionality described below for ranking social-content items. In some instances, the ranking module 210 can be stored in the memory 237 of the computing device 200 and can be accessible and executable by the processor 235. The ranking module 210 may be adapted for cooperation and communication with the processor 235 and other components of the computing device 200 via signal line 230.

In some implementations, the ranking module 210 ranks social-content items based on social popularity. In some instances, the ranking module 210 determines social popularity for a social-content item based on user social-activities associated with the social-content item. Examples for user social-activities associated with a social-content item can include, but not limited to, comments on the social-content item, positive endorsements for the social-content item, negative endorsements for the social-content item, clicks on the social-content item, reviews on the social-content item, shares of the social-content item, etc. In some instances, the ranking module 210 determines a social popularity score for a social-content item based on the number of user social-activities associated with the social-content item. For example, the ranking module 210 calculates the number of comments, positive endorsements, clicks, reviews and shares received by a social-content item (e.g., 188 times). The ranking module 210 determines a social popularity score for the social-content item that is in proportion to the number. In some instances, the ranking module 210 ranks a social-content item higher if it has a higher social popularity score.

In some implementations, the ranking module 210 ranks social-content items based on third-party ranking scores. In some instances, a third-party ranking score represents a historical ranking for a content item. A third-party ranking score for a content item can be determined based on historical data associated with the content item. In some instances, a third-party ranking score for a content item can be determined by one or more third-party websites publishing the content item. In some instances, the ranking module 210 processes a set of criteria-metrics for determining a third-party ranking score for a content item. For example, the ranking module 210 processes a set of criteria-metrics including a limited number of criteria, e.g., criteria 1, criteria 2 . . . criteria n. The ranking module 210 determines third-party ranking scores for social-content items based on the set of criteria-metrics. In some instances, the ranking module 210 receives, via the controller 204, third-party ranking scores for social-content items from one or more third-party servers.

In some instances, the ranking module 210 determines a third-party ranking score based on third-party popularity. For example, the ranking module 210 determines the number of third-party user activities associated with the content indicted by the link contained in the social-content item. In some instances, the ranking module 210 determines the number of third-party user activities associated with the content published by the publisher who also published the social-content item. In some instances, the third-party user activities can include, but not limited to, user interactions with the content indicated by the link occurring on one or more third-party websites. For example, users 125 clicks the news article referred to by the link in the social-content item; users 125 comments on the news article referred to by the link in the social-content item; etc. In some instances, the ranking module 210 determines a third-party ranking score for the social-content item based on the number of third-party user activities associated with the content indicted by the link contained in the social-content item. In some instances, the ranking module 210 receives a third-party ranking score for a social-content item from a third-party server that determines the third-party ranking score for the social-content item based on the number of third-party user activities.

In some instances, the ranking module 210 determines a third-party ranking score based on terms used in the news stories. For example, the ranking module 210 searches one or more terms in content of the news-story cluster associated with the social-content item and uses the one or more terms as a measure. In some instances, the ranking module 210 determines terms used in the content published by the publisher who also published the social-content item. In some instances, the ranking module 210 determines a third-party ranking score based on a comparison between the particular social-content item with one or more other content items in the news-story cluster. For example, the ranking module 210 determines a third-party ranking score for the social-content item by comparing the social-content item with other content items (e.g., new articles retrieved from third-party websites). In some instances, the ranking module 210 compares the content published by the publisher of the social-content item with content published by other publishers. In some instances, the ranking module 210 determines a third-party ranking score based on a combination of the third-party popularity, the terms used in the social-content item and the comparison criteria ranking. In some implementations, the ranking module 210 determines a secondary ranking based on any combination of the social popularity and the third-party ranking score for the social-content item associated with the news-story cluster.

In some instances, the ranking module 210 also ranks news stories in one news-story cluster based on the set of criteria metrics. For example, the ranking module 210 determines the best new story based on the third-party ranking scores for the content items in the news-story cluster. In some implementations, the ranking module 210 determines a publisher for a social-content item. For example, the ranking module 210 determines a publisher who publishes the social-content item, for example, a news article. In some implementations, the ranking module 210 determines a quality of the publisher based on information of the publisher. In some instances, the ranking module 210 determines a quality of the publisher based on certain criteria. For example, the ranking module 210 processes historical publications (e.g., news articles, videos, audios, etc.) by the publisher and user feedback about the historical publications (e.g., user comments, acknowledgements, sharing, posts, etc., related to the historical publications). The ranking module 210 thus can determine a quality of the publisher. For example, if the publisher has published a certain amount of content and received a certain number of positive endorsements and shares, the ranking module 210 determines the quality of the publisher based on the certain amount of content and the certain of number of feedbacks. For example, the ranking module 210 determines a quality score in proportion to the certain amount and the certain number. In some implementations, the ranking module 210 determines a ranking score for the social-content item based on the quality score of the publisher.

In some implementations, the ranking module 210 sends the ranked social-content items to the content-item resharing module 212. In some implementations, the ranking module 210 stores the ranked social-content items in the second storage 247.

The content-item resharing module 212 can be software including routines for generating a resharing content item based on the ranked social-content items. In some implementations, the content-item resharing module 212 can be a set of instructions executable by the processor 235 to provide the functionality described below for generating a resharing content item based on the ranked social-content items. In some instances, the content-item resharing module 212 can be stored in the memory 237 of the computing device 200 and can be accessible and executable by the processor 235. The content-item resharing module 212 may be adapted for cooperation and communication with the processor 235 and other components of the computing device 200 via signal line 232.

In some implementations, the content-item resharing module 212 generates a resharing content item including ranked social-content items. For example, the content-item resharing module 212 generates a resharing post including multiple ranked social-posts associated with the same news-story cluster. In some implementations, the content-item resharing module 212 generates a resharing content item that also includes content items contained in the news-story cluster. For example, the content-item resharing module 212 generates a resharing social post that also includes one or more news articles contained in the news-story cluster. In some implementations, the content-item resharing module 212 generates a resharing content item that also includes a link to the news-story cluster associated with the social content items. For example, assume one or more ranked social-posts are associated with a top news story. The content-item resharing module 212 generates a resharing social post that includes a link to the top news story.

In some implementations, the content-item resharing module 212 removes one or more duplicated social-content items from the resharing content item. In some instances, the content-item resharing module 212 determines if there are two or more social-content items that are the same or substantially similar to each other. In some instances, the content-item resharing module 212 determines whether there are two or more social-content items describing the same or substantially similar content. In some instances, the content-item resharing module 212 determines whether there are two or more social-content items including two or more first links leading to the same or substantially similar content published on third-party websites. If so, the content-item resharing module 212 determines that they are duplicated and removes all but one of the social-content items from the resharing content item.

The display module 214 can be software including routines for generating graphical data for displaying the resharing content item. In some implementations, the display module 214 can be a set of instructions executable by the processor 235 to provide the functionality described below for generating graphical data for displaying the resharing content item. In some instances, the display module 214 can be stored in the memory 237 of the computing device 200 and can be accessible and executable by the processor 235. The display module 214 may be adapted for cooperation and communication with the processor 235 and other components of the computing device 200 via signal line 234.

In some implementations, the display module 214 generates graphical data for displaying resharing content items and sends the graphical data to the user-interface module 202 for providing the resharing content items to users 125.

Figure 3:
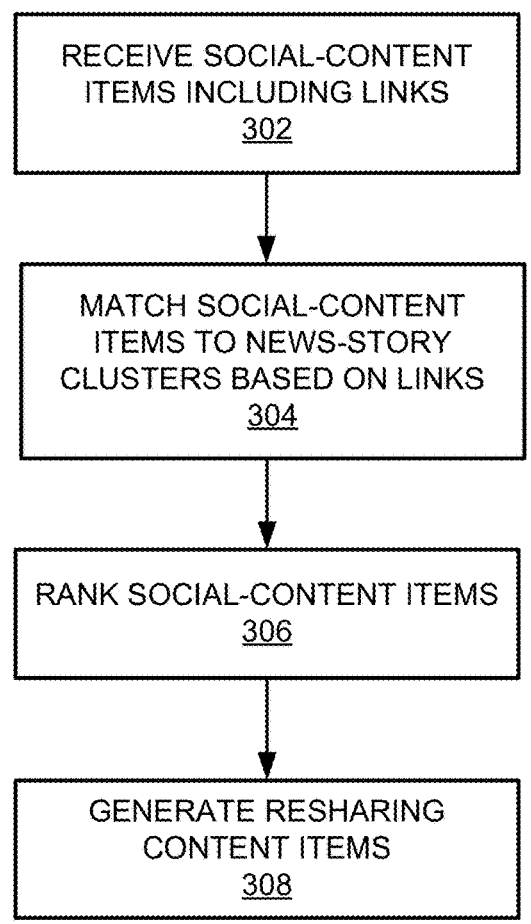
FIG. 3 is a flowchart of an example method for resharing content items.

Referring now to FIG. 3, an example method indicated by reference numeral 300 for resharing content items is described. In the illustrated implementation, the method 300 as illustrated by block 302 includes one or more operations for receiving social-content items including links. For example, the content-item determination module 206 cooperates with the controller 204 to receive social-content items from a variety of resources and determines one or more social-content items that contain one or more links (e.g., URLs). The method 300 can include as illustrated by block 304, one or or more operations for matching the social-content items to news-story clusters based on the links. For example, the matching module 208 determines whether the social-content items are related to one or more news-story clusters based on the links contained in the social-content items. The method 300 may also include ranking the social-content items. For example, the ranking module 210 ranks the social-content items based on a set of criteria-metrics. The method 300 can include as indicated by block 308, one or more operations for generating resharing content items. For example, the content-item resharing module 212 generates a resharing content item including the ranked social-content items and other content items contained in the news-story cluster.

Figure 4:
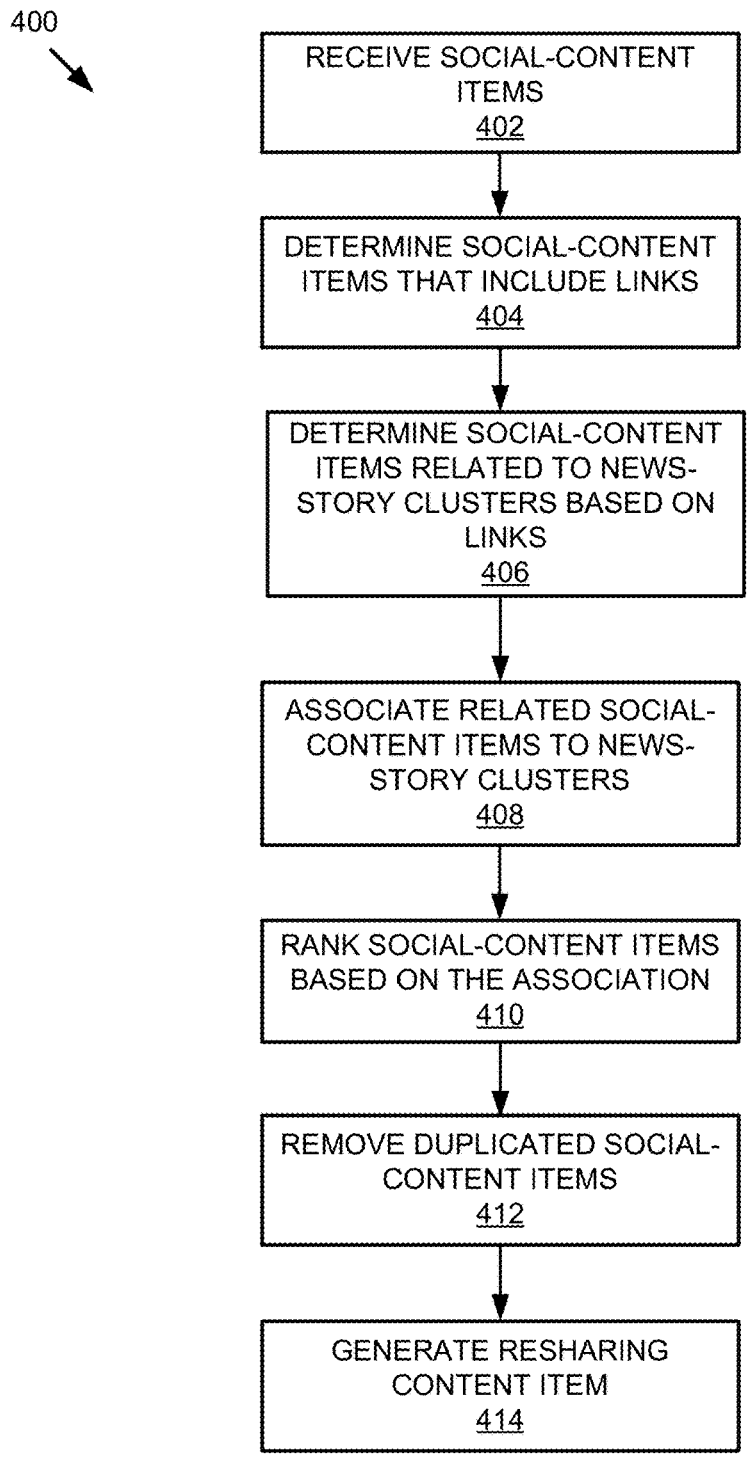
FIG. 4 is a flowchart of another example method for resharing content items.

Referring now to FIG. 4, another example method 400 for resharing content items is described. The method 400 can include as indicated by block 402, one or more operations for receiving social-content items. For example, the content-item determination module 206 cooperates with the controller 204 to receive social-content items published by users 125 on social network websites (e.g., posts, comments, photos, videos, audios, articles, etc.). In some instances, the content-item determination module 206 receives, via the controller 204 and the communication unit 245, social-content items from other appropriate systems where users 125 publish the social-content items. The method 400 can also include as indicated by block 404, one or more operations for determining social-content items that include links.

For example, the content-item determination module 206 determines if a received social-content item contains a link (e.g., a URL). For example, the content-item determination module 206 parses a post and determines if a URL linking to other published content is present in the title or the body of the post. In some instances, the content-item determination module 206 determines, from the received social-content items, one or more social-content items that contain one or more links.

The method 400 can include as indicated by block 406, one or more operations for determining social-content items related to news-story clusters based on links. For example, the matching module 208 receives the one or more social-content items containing one or more links and receives one or more news-story clusters describing one or more news stories. In some instances, a news-story cluster is generated and stored by the news server 109. For example, a news-story cluster includes news articles describing a news story of one topic, e.g., "Tornado in Oklahoma." In some instances, the matching module 208 determines if a social-content item is related to a news-story cluster by determining if they reference or relate events on the same news story. In some instances, the matching module 208 determines if a social-content item is related to a news-story cluster based on the links. This link-based determination process will be described in further detail below with reference to FIG. 5.

The method 400 can include as indicated by block 408, one or more operations for associating the related social-content items to the news-story clusters. For example, if the matching module 208 determines that a social-content item is related to a news-story cluster, the matching module 208 associates the social-content item with the news-story cluster. The method 400 may also include as indicated by block 410, one or more operations for ranking the social-content items based on the association. For example, if there are multiple social-content items associated with one news-story cluster, the ranking module 210 ranks the multiple social-content items. For example, the ranking module 210 determines the best news story in one news-story cluster. In some instances, the ranking module 210 ranks the social-content items based on a set of criteria-metrics. This ranking process will be described in further detail below with reference to FIGS. 6A-6B.

The method 400 as indicated by block 412 can include removing duplicated social-content items. For example, the content-item resharing module 212 determines if there are two or more social-content items that are the same or substantially similar to each other. If so, the content-item resharing module 212 determines that the two or more social-content items are duplicated and removes all but one of them. The method 400 may also include as indicated by block 414, one or more operations for resharing content items. For example, the content-item resharing module 212 generates a resharing content item including the ranked and non-duplicated social-content items. In some instances, the content-item resharing module 212 generates a resharing content item that also includes one or more news articles contained in the news-story cluster.

Figure 5:
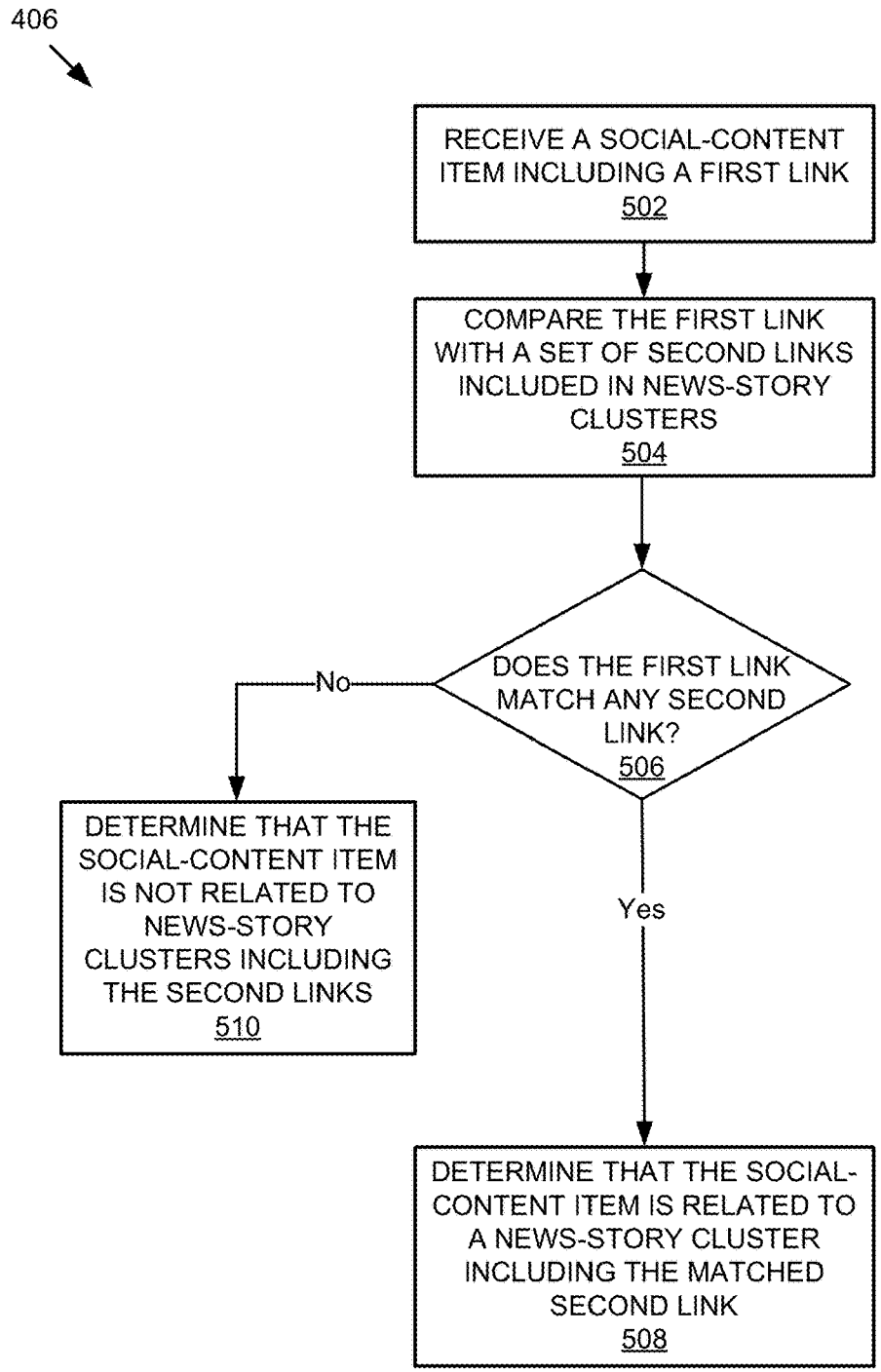
FIG. 5 is a flowchart of an example method for determining social-content items related to news-story clusters based on links.

Referring now to FIG. 5, an example method indicated at block 406 for determining whether a social-content item is related to a news-story cluster is described in further detail. In the illustrated implementation, the method 406 can include as indicated by block 502, one or more operations for receiving a social-content item including a first link. For example, the matching module 208 receives a social-content item that contains a first link from the content-item determination module 206. The method 406 can also include as indicated by block 504, one or more operations for comparing the first link with a set of second links included in news-story clusters. For example, the matching module 208 receives a set of news-story clusters that include a set of second links. The matching module 208 compares the first link contained in the social-content item with the set of second links contained in the news-story clusters. The method 406 can include as indicated by block 506, one or more operations for determining if the first link matches any of the second links. In some instances, the matching module 208 determines whether the first link matches any one of the set of second links. For example, the matching module 208 determines if the first link is the same or substantially similar to any one of the second links. In some instances, the matching module 208 determines if the first link leads to the same or substantially similar news articles as any of the second links does. If so, the matching module 208 determines that the first link matches one of the second links.

If the first link matches one of the second links, the method 406 may include as indicated by block 508, one or more operations for determining that the social-content item is related to a news-story cluster including the matched second link. For example, if the matching module 208 determines that the first link matches one of the second links, the matching module 208 determines that the social-content item containing the first link is related to the news-story cluster containing the matched second link. If the first link does not match any of the second links, the method 406 can include as indicated by block 510, one or more operations for determining that the social-content item is not related to any of the news-story clusters including the second links. For example, if the matching module 208 determines that the first link does not match any of the second links, the matching module 208 determines that the social-content item containing the first link is not related to any of the news-story clusters containing the second link.

Figure 6A:
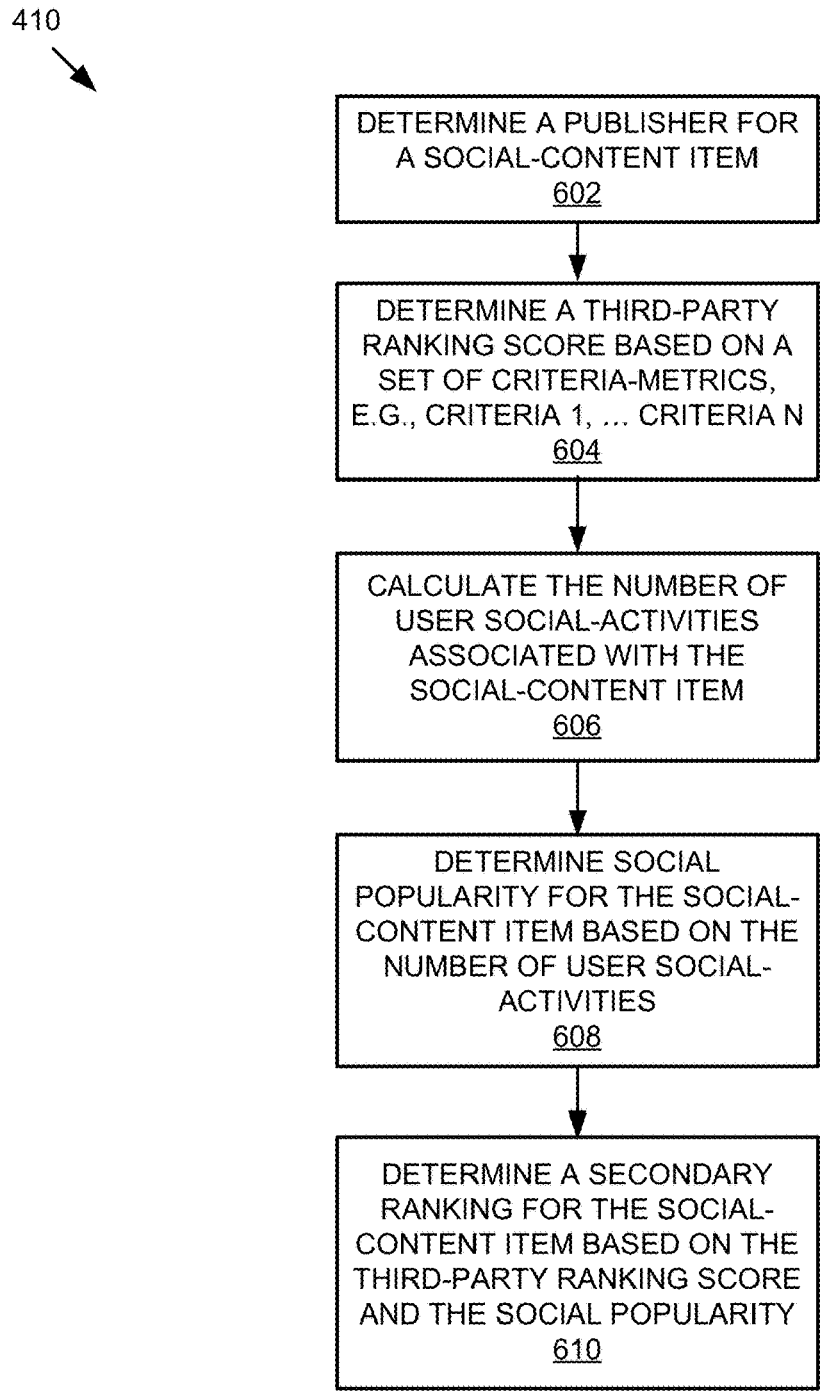
FIG. 6A is a flowchart of an example method for ranking social-content items based on association between social-content items and news-story clusters.
Figure 6B:
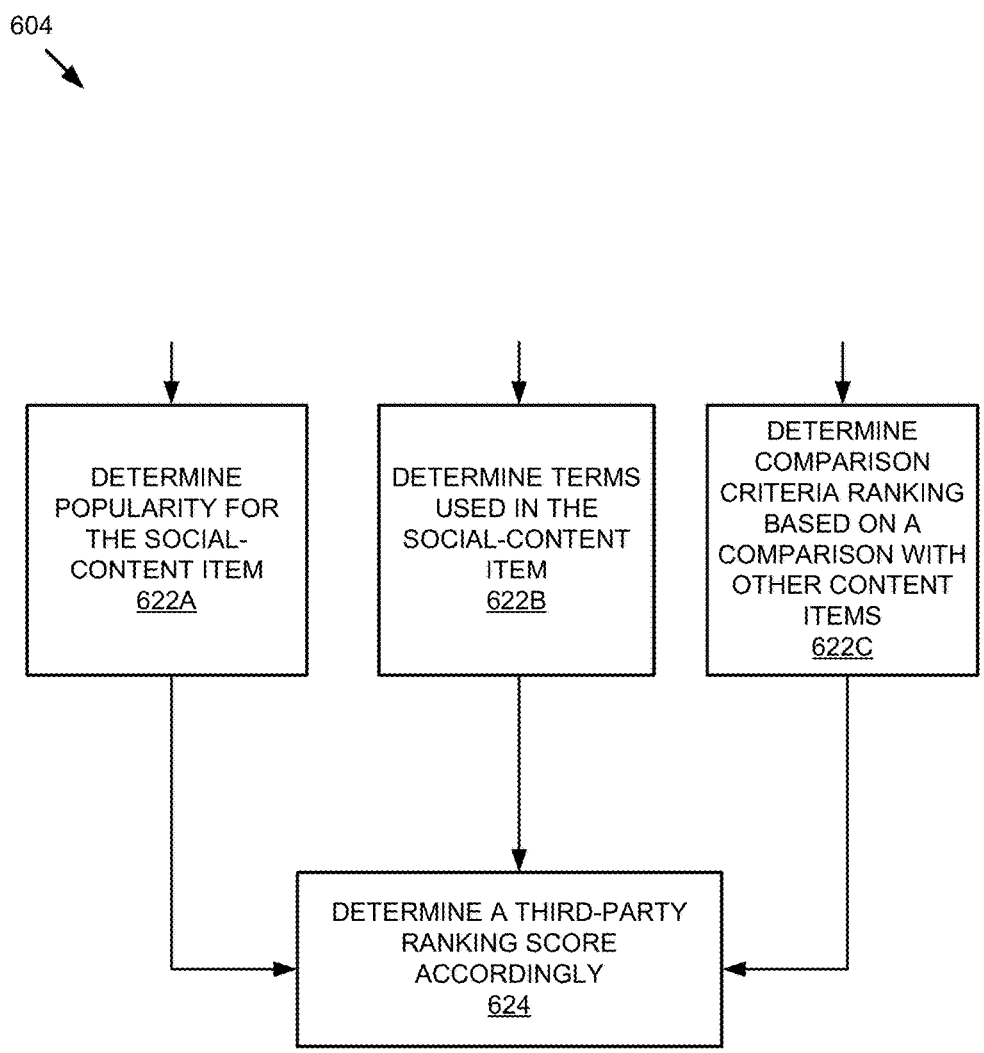
FIG. 6B is a flowchart of an example method for determining a third-party ranking score based on a set of criteria-metrics.

Referring now to FIGS. 6A-6B, an example method 410 for ranking social-content items is described in more detail. Turning to FIG. 6A, the method 410 can include determining a publisher for a social-content item. For example, the ranking module 210 determines a publisher for a social-content item. For example, the ranking module 210 can then determine a ranking for the social-content item based on a ranking score or a quality of the publisher. The method 410 may also include as indicated by block 604, one or more operations for determining a third-party ranking score based on a set of criteria-metrics, e.g., criteria 1, criteria 2 . . . criteria n. For example, the criteria-metrics include a certain number of criteria. In some instances, the ranking module determines a third-party ranking score for the social-content item based on a certain number of criteria. This process for determining a third-party ranking score will be described in further detail with reference to FIG. 6B.

The method 410 can include as indicated by block 606, one or more operations for calculating the number of user social-activities associated with the social-content item. Examples of user social-activities associated with a social-content item may include, but are not limited to, comments on the social-content item, positive endorsements for the social-content item, negative endorsements for the social-content item, clicks on the social-content item, reviews on the social-content item, shares of the social-content item, etc. For example, the ranking module 210 calculates the number of user social-activities on the social-content item. The method 410 can include as indicated by block 608, one or more operations for determining a social popularity for the social-content item based on the number of user social-activities. For example, the ranking module 210 determines a social popularity score for the social-content item that is in proportion to the number. The method 410 may also include as indicated by block 610, one or more operations for determining a secondary ranking for the social-content item based on the third-party ranking score and the social popularity score.

Referring now to FIG. 6B, an example of a method 604 for determining a third-party ranking score is described. In the illustrated implementation, the method as indicated by block 604 can include determining 622A popularity for the social-content item. In some instances, the ranking module 210 determines the number of third-party user activities associated with the content indicted by the link contained in the social-content item. In some instances, the ranking module 210 determines the number of third-party user activities associated with the content published by the publisher who also published the social-content item. The ranking module 210 determines third-party popularity for the social-content item based on the number of third-party user activities. The method as indicated by block 604 can include determining 622B terms used in the social-content item. For example, the ranking module 210 determines terms used in the social-content item or in other content published by the publisher. The method 604 may include determining 622C a comparison criteria ranking based on a comparison with other content items. For example, the ranking module 210 compares the social-content item with other content items. For example, the ranking module 210 compares the content published by the publisher of the social-content item with content published by other publishers. The method 604 can include as indicated by block 624, one or more operations for determining a third-party ranking score accordingly. In some instances, the ranking module 210 determines a third-party ranking score based on the third-party popularity. In some instances, the ranking module 210 determines a third-party ranking score based on the terms used in the social-content item. In some instances, the ranking module 210 determines a third-party ranking score based on comparison criteria ranking. In some instances, the ranking module 210 determines a third-party ranking score based on a combination of the third-party popularity, the terms used in the social-content item and the comparison criteria ranking.

Figure 7:
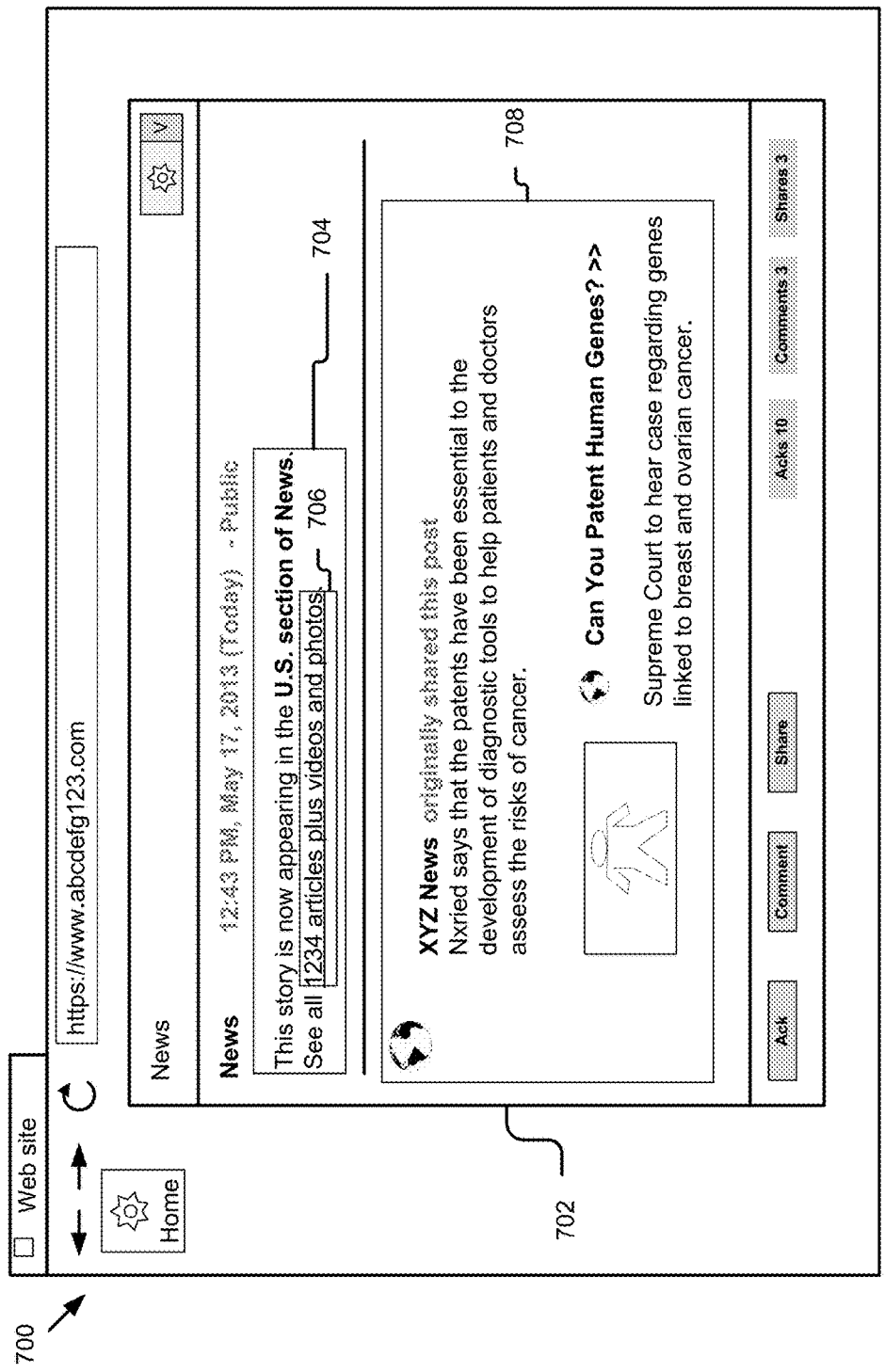
FIG. 7 is a graphic representation of an example user interface for displaying a reshared post.

FIG. 7 is a graphic representation of an example user interface indicated by reference numeral 700 for displaying a reshared post. The user interface 700 includes a graphical representation of a resharing news post 702. The resharing news post 702 includes a graphical representation of text 704 describing why the news post 702 is reshared with URL links to a section of a news website and a web page containing the reshared news story. The resharing post 702 also includes a graphical representation of content 708 that describes the highest ranked news article and a URL link to the same news article appearing on the news website.

Figure 8:
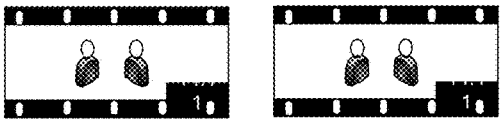
FIG. 8 is a graphic representation of an example user interface for displaying a news story including ranked posts.

FIG. 8 is a graphic representation of an example user interface 800 for displaying a news story including ranked posts. The user interface 800 includes a graphical representation of the highest ranked news post 804 and a list of ranked news posts 806, 808, 810, 812. In the illustrated implementation, the ranked news posts 804, 806, 808, 810, 812 describe, relate, or reference the same news story of the same topic included in one news-story cluster. In some instances, one or more of the news posts 804, 806, 808, 810, 812 are social-content items.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving one or more social-content items that include one or more first links;
   receiving a news-story cluster that includes one or more second links;
   determining whether the one or more social-content items are related to the news-story cluster based on whether the one or more second links match one of the one or more first links; and
   responsive to determining that the one or more social-content items are related to the news-story cluster,
      associating the one or more social-content items with the news-story cluster;
      determining a third-party ranking score for the one or more social-content items associated with the news-story cluster received by a social media system based on user activities on one or more third-party servers that are associated with content directed to by the one or more first links and a comparison between content published by a publisher of a social content-item of the one or more social-content items to other content items published by other publishers and included in the news-story cluster;
      ranking the one or more social-content items associated with the news-story cluster based on user activities associated with the one or more social-content items and the third-party ranking score of the one or more social-content items;
      removing one or more duplicate social-content items from the one or more ranked social-content items associated with the news-story cluster to generate one or more ranked and non-duplicate social-content items; and
      generating a resharing content item including at least one of the ranked and non-duplicate social content items associated with the news-story cluster, wherein a higher ranked social content item associated with the news-story cluster is displayed more prominently as compared to lower ranked social content items associated with the news-story cluster.

2. The method of claim 1, wherein determining whether the one or more social-content items are related to the news-story cluster further comprises:
   comparing the one or more first links with the one or more second links; and
   determining whether the one or more first links match the one or more second links.

3. The method of claim 1, wherein the one or more social-content items are associated with one or more news publishers.

4. The method of claim 3, wherein ranking the one or more social-content items is based on assessing a quality of the one or more news publishers.

5. The method of claim 1, wherein ranking the one or more social-content items is based on popularities of the one or more social-content items.

6. The method of claim 1, wherein the resharing content item also includes one or more news-content items included in the news-story cluster.

7. The method of claim 1, wherein the news-story cluster includes multiple news-story items.

8. A computer program product comprising a non-transitory computer usable medium including a computer readable program, wherein the computer readable program when executed on a computer causes the computer to:
   receive one or more social-content items that include one or more first links;
   receive a news-story cluster that includes one or more second links;
   determine whether the one or more social-content items are related to the news-story cluster based on whether the one or more second links match one of the one or more first links; and
   responsive to determining that the one or more social-content items are related to the news-story cluster,
      associate the one or more social-content items with the news-story cluster;
      determine a third-party ranking score for the one or more social-content items associated with the news-story cluster received by a social media system based on user activities on one or more third-party servers that are associated with content directed to by the one or more first links and a comparison between content published by a publisher of a social content-item of the one or more social-content items to other content items published by other publishers and included in the news-story cluster;
      rank the one or more social-content items associated with the news-story cluster based on user activities associated with the one or more social-content items and the third-party ranking score of the one or more social-content items;
      remove one or more duplicate social-content items from the one or more ranked social-content items associated with the news-story cluster to generate one or more ranked and non-duplicate social-content items; and
      generate a resharing content item including at least one of the ranked and non-duplicate social-content items associated with the news-story cluster, wherein a higher ranked social content item associated with the news-story cluster is displayed more prominently as compared to lower ranked social content items associated with the news-story cluster.

9. The computer program product of claim 8, wherein to determine whether the one or more social-content items are related to the news-story cluster, the computer readable program when executed on the computer further causes the computer to:
   compare the one or more first links with the one or more second links; and
   determine whether the one or more first links match the one or more second links.

10. The computer program product of claim 8, wherein the one or more social-content items are associated with one or more news publishers.

11. The computer program product of claim 10, wherein ranking the one or more social-content items is based on quality of the one or more news publishers.

12. The computer program product of claim 8, wherein ranking the one or more social-content items is based on popularities of the one or more social-content items.

13. The computer program product of claim 8, wherein the resharing content item also includes one or more news-content items included in the news-story cluster.

14. The computer program product of claim 8, wherein the news-story cluster includes multiple news-story items.

15. A system comprising:
a processor; and
a memory storing instructions that, when executed, cause the system to:
  receive one or more social-content items that include one or more first links;
  receive a news-story cluster that includes one or more second links;
  determine whether the one or more social-content items are related to the news-story cluster based on whether the one or more second links match one of the one or more first links; and
  responsive to determining that the one or more social-content items are related to the news-story cluster, associate the one or more social-content items with the news-story cluster;
  determine a third-party ranking score for the one or more social-content items associated with the news-story cluster received by a social media system based on user activities on one or more third-party servers that are associated with content directed to by the one or more first links and a comparison between content published by a publisher of a social content-item of the one or more social-content items to other content items published by other publishers and included in the news-story cluster;
  rank the one or more social-content items associated with the news-story cluster based on user activities associated with the one or more social-content items and the third-party ranking score of the one or more social-content items;
  remove one or more duplicate social-content items from the one or more ranked social-content items associated with the news-story cluster to generate one or more ranked and non-duplicate social-content items; and
  generate a resharing content item including at least one of the ranked and non-duplicate social-content items associated with the news-story cluster, wherein a higher ranked social content item associated with the news-story cluster is displayed more prominently as compared to lower ranked social content items associated with the news-story cluster.

16. The system of claim 15, wherein to determine whether the one or more social-content items are related to the news-story cluster, the instructions that, when executed, further cause the system to:
  compare the one or more first links with the one or more second links; and
  determine whether the one or more first links match the one or more second links.

17. The system of claim 15, wherein the one or more social-content items are associated with one or more news publishers.

18. The system of claim 17, wherein ranking the one or more social-content items is based on assessing a quality of the one or more news publishers.

19. The system of claim 15, wherein ranking the one or more social-content items is based on popularities of the one or more social-content items.

20. The system of claim 15, wherein the news-story cluster includes multiple news-story items.

* * * * *